(12) United States Patent
Yu

(10) Patent No.: US 9,831,962 B1
(45) Date of Patent: Nov. 28, 2017

(54) ENVIRONMENT IDENTIFICATION BASED ON MULTIPLE PROXIMATE HUBS

(71) Applicant: EVA Automation, Inc., Redwood City, CA (US)

(72) Inventor: Gaylord Yu, San Francisco, CA (US)

(73) Assignee: EVA Automation, Inc., Redwood City, CA (US)

( * ) Notice: Subject to any disclaimer, the term of this patent is extended or adjusted under 35 U.S.C. 154(b) by 0 days.

(21) Appl. No.: 15/607,608

(22) Filed: May 29, 2017

(51) Int. Cl.
| H04H 20/71 | (2008.01) |
| H04B 17/27 | (2015.01) |
| H04B 17/26 | (2015.01) |
| H04B 1/10 | (2006.01) |
| H04B 17/309 | (2015.01) |

(52) U.S. Cl.
CPC .......... H04B 17/27 (2015.01); H04B 1/1027 (2013.01); H04B 17/26 (2015.01); H04B 17/309 (2015.01)

(58) Field of Classification Search
CPC ...... H04B 17/27; H04B 17/26; H04B 17/309; H04B 1/1027
See application file for complete search history.

(56) References Cited

U.S. PATENT DOCUMENTS

| 9,544,848 B2* | 1/2017 | Jafarian | H04W 52/0229 |
| 9,769,591 B2* | 9/2017 | Nguyen | H04W 4/005 |
| 2005/0227647 A1* | 10/2005 | Dorfman | H04B 1/0064 455/142 |
| 2007/0155408 A1* | 7/2007 | Belcea | G01S 5/0205 455/458 |
| 2007/0275722 A1* | 11/2007 | Thorson | H04W 36/0055 455/436 |
| 2012/0236822 A1* | 9/2012 | Fang | H04W 36/0033 370/331 |
| 2015/0147990 A1* | 5/2015 | Kreitzer | H04B 1/16 455/132 |
| 2016/0345117 A1* | 11/2016 | Nguyen | H04W 4/005 |

* cited by examiner

Primary Examiner — Dominic Rego
(74) Attorney, Agent, or Firm — Steven Stupp

(57) ABSTRACT

An audio/video (A/V) hub that determines an environment of a portable electronic device is described. In particular, the A/V hub may identify the environment based on performance information about communication between the portable electronic device and receiver devices (which was received from the receiver devices), and a history of behavior of an individual associated with the portable electronic device and the A/V hub. Alternatively, the A/V hub may identify the environment based on performance information about communication between the portable electronic device and the A/V hub and the portable electronic device and another A/V hub (which was received from the portable electronic device and/or the other A/V hub), and a history of behavior of an individual associated with the portable electronic device and the A/V hub. Based on the determination, the A/V hub provides an instruction to power on an A/V display device in the environment.

20 Claims, 8 Drawing Sheets

ENVIRONMENT IDENTIFICATION BASED ON MULTIPLE PROXIMATE HUBS

CROSS REFERENCE TO RELATED APPLICATIONS

This application is related to U.S. patent application Ser. No. 15/607,610, "Environment Identification Based on Multiple Proximate Hubs," filed on May 29, 2017.

BACKGROUND

Field

The described embodiments relate to communication techniques, including determining an environment of an electronic device based on the communication performance during communication with proximate electronic devices in one or more environments and/or a history of user behavior.

Related Art

Wireless communication is an increasingly popular technology for communicating information between electronic devices. In particular, these electronic devices may include networking subsystems that implement a network interface for a wireless local area network such as: a wireless network described in the Institute of Electrical and Electronics Engineers (IEEE) 802.11 standard, Bluetooth® (from the Bluetooth Special Interest Group of Kirkland, Wash.), and/or another type of wireless network.

Moreover, wireless communication can be used to be used to provide a wide variety of services to users of the electronic devices. For example, wireless communication can be used to determine a location of an electronic device. Then, the determined location can be used to provide location-based services to a user.

However, it can be difficult to determine the location of an electronic device in some environments. For example, because of attenuated wireless signals and/or multipath wireless signals, it can be difficult to determine the location when an electronic device is indoors. Furthermore, because of interference, it can also be difficult to determine the location when an electronic device is in a crowded or a high-density communication environment.

The difficulty in determining the location can degrade the accuracy of the determined location, which can adversely impact the quality or the availability of location-based services. Consequently, the difficulty in determining the location of an electronic device in some environments can be frustrating for users and can degrade the user experience when using the electronic device.

SUMMARY

The described embodiments include an audio/video (A/V) hub. This A/V hub includes: an antenna; an interface circuit that, during operation, communicates with a first receiver device in a first environment and a second receiver device in a second environment; and a control circuit coupled to the interface circuit. During operation, the control circuit receives, via the interface circuit, a first message from a first receiver device with first performance information about communication between the first receiver device and a portable electronic device. Moreover, the control circuit receives, via the interface circuit, a second message from a second receiver device with second performance information about communication between the second receiver device and the portable electronic device. Then, the control circuit determines that the portable electronic device is in the first environment based on the first performance information, the second performance information, and a history of behavior of an individual associated with the portable electronic device and the A/V hub. Furthermore, based on the determination, the control circuit provides, via the interface circuit, an instruction to power on an A/V display device in the first environment.

For example, the first environment and the second environment may be in a room in a building. Alternatively, the first environment and the second environment may be different, adjacent rooms in a building.

Note that, when the determination is inconclusive, the control circuit may provide a question to the portable electronic device for the individual to specify the environment of the portable electronic device.

Moreover, the determination may be based on a comparison of the first performance information and the second performance information. Furthermore, the determination may be based on a location of the portable electronic device, which may be determined based on the first performance information and the second performance information.

In some embodiments, given performance information in the first performance information and the second performance information includes: a received signal strength indicator (RSSI) received from a given receiver device by the portable electronic device (or vice versa); and/or time-of-flight information for the communication between the given receiver device and the portable electronic device.

Furthermore, the control circuit may provide A/V content to the A/V display device based on the history of behavior of the individual associated with the A/V hub. Alternatively or additionally, the A/V hub may transcode A/V content for the individual based on a format of the A/V display device, and may provide the transcoded A/V content to the A/V display device for display.

In some embodiments, the control circuit includes: a processor; and a memory, coupled to the processor, which stores a program module that, during operation, is executed by the processor. The program module may include instructions for at least some operations performed by the control circuit.

Instead of receiving the first message from the first receiver device and the second message from the second receiver device, in some embodiments the A/V hub receives information from other electronic devices. In particular, during operation, the interface circuit may communicate with the portable electronic device and a second A/V hub in a second environment. Moreover, the control circuit may receive, via the interface circuit, a message from the portable electronic device with third performance information about communication between the portable electronic device and the A/V hub. Then, the control circuit receives, via the interface circuit, a coordination message from the second A/V hub with fourth performance information about communication between the portable electronic device and the second A/V hub. Next, the control circuit determines that the portable electronic device is in the first environment of the A/V hub instead of the second environment based on the third performance information and the fourth performance information. Furthermore, the control circuit provides, via the interface circuit, the instruction to power on the A/V display device in the environment based on the determination.

Note that, when the determination is inconclusive, the control circuit may provide a question to the portable electronic device for the individual to specify the environment of the portable electronic device.

Moreover, given performance information in the first performance information and the second performance information may include: an RSSI received from a given A/V hub by the portable electronic device (or vice versa); and/or time-of-flight information for the communication between the given A/V hub and the portable electronic device.

In some embodiments, the A/V hub determines that the portable electronic device is in the first environment based on additional information, such as sound measured in the first environment and/or one or more images acquired in the first environment. This determination may be based, at least in part, on the first performance information, the second performance information and/or the history of behavior. However, in some embodiments the determination is made without using the first performance information, the second performance information and/or the history of behavior.

Another embodiment provides a computer-program product for use with the A/V hub. This computer-program product includes instructions for at least some of the operations performed by the A/V hub.

Another embodiment provides a method for determining the environment of the portable electronic device. This method includes at least some of the operations performed by the A/V hub.

Another embodiment provides the A/V display device and/or the portable electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
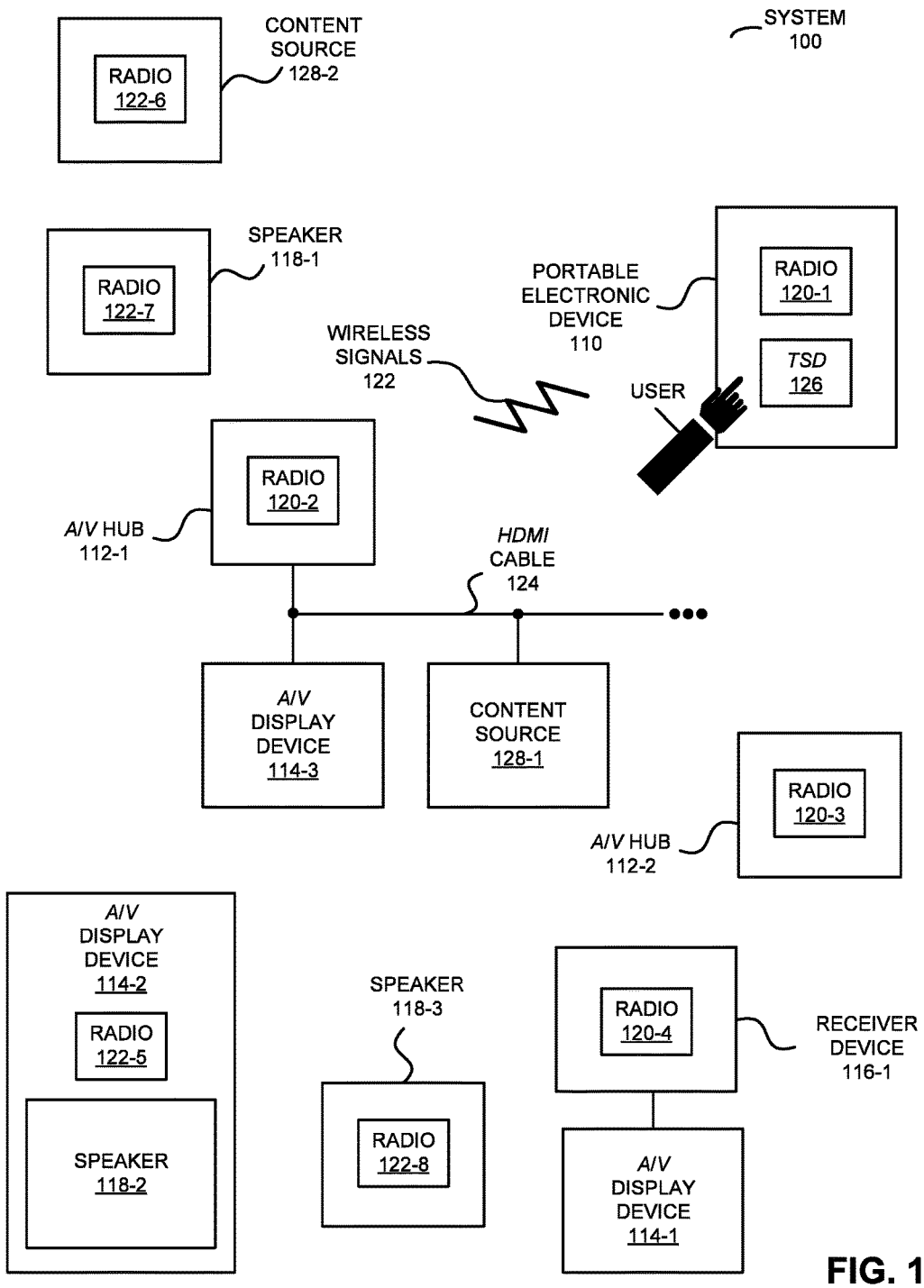
FIG. 1 is a block diagram illustrating a system with electronic devices wirelessly communicating in accordance with an embodiment of the present disclosure.

An audio/video (A/V) hub that determines an environment of a portable electronic device is described. In particular, the A/V hub may identify the environment based on performance information about communication between the portable electronic device and receiver devices (which was received from the receiver devices), and a history of behavior of an individual associated with the portable electronic device and the A/V hub. Alternatively, the A/V hub may identify the environment based on performance information about communication between the portable electronic device and the A/V hub and the portable electronic device and another A/V hub (which was received from the portable electronic device and/or the other A/V hub), and a history of behavior of an individual associated with the portable electronic device and the A/V hub. Based on the determination, the A/V hub provides an instruction to power on an A/V display device in the environment.

By determining the environment of the portable electronic device, this communication technique may facilitate environment-based services in the environment. In particular, the communication technique may facilitate a 'follow me' feature in which an environment (such as a room or in a building) is determined so that A/V content that the individual (such as a user of the A/V hub) was recently watching in a different environment (such as a different location in the room or a different room in the building) is automatically presented on the A/V display device. Alternatively, even when the individual was not recently watching the A/V content at a different location or in a different environment, the communication technique may facilitate automated presentation of the A/V content or related A/V content (such as A/V content having similar characteristics to those of the A/V content) on the A/V display device when the individual is in the environment. This capability may simplify use of the A/V hub, thereby reducing user frustration and/or may improve the user experience when using the A/V hub, the A/V display device, and/or the portable electronic device. Consequently, the communication technique may increase customer loyalty and revenue of a provider of the A/V hub.

In the discussion that follows the A/V hub (which is sometimes referred to an 'electronic device'), the A/V display device, the portable electronic device, one or more receiver devices, and/or another electronic device (such as a speaker and, more generally, a consumer-electronic device) may include radios that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), a cellular-telephone communication protocol, a near-field-communication standard or specification (from the NFC Forum of Wakefield, Mass.), and/or another type of wireless interface. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a 4$^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used (such as Ethernet or a power-line communication protocol). In addition, the communication may occur via a wide variety of frequency bands. Note that the portable electronic device, the A/V hub, the A/V display device, and/or one or more other electronic devices may communicate using infra-red communication that is compatible with an infra-red communication standard (including unidirectional or bidirectional infra-red communication).

Moreover, A/V content in following discussion may include video and associated audio (such as music, sound, dialog, etc.), video only or audio only.

Communication among electronic devices is shown in FIG. 1, which presents a block diagram illustrating a system 100 with a portable electronic device 110 (such as a remote control or a cellular telephone), one or more A/V hubs 112 (such as A/V hubs 112-1), one or more A/V display devices 114 (such as a television, a monitor, a computer and, more generally, a display associated with an electronic device), one or more receiver devices (such as receiver device 116-1, e.g., a local wireless receiver associated with a proximate A/V display device 114-1 that can receive frame-by-frame transcoded A/V content from one of A/V hubs 112 for display on A/V display device 114-1), one or more speakers 118 (and, more generally, one or more electronic devices that include one or more speakers) and/or one or more content sources 128 associated with one or more content providers (e.g., a radio receiver, a video player, a satellite receiver, an access point that provides a connection to a wired network such as the Internet, a media or a content source, a consumer-electronic device, an entertainment device, a set-top box, over-the-top content delivered over the Internet or a network without involvement of a cable, satellite or multiple-system operator, a security camera, a monitoring camera, etc.). Note that A/V hubs 112, A/V display devices 114, receiver device 116-1 and speakers 118 are sometimes collectively referred to as 'components' in system 100. However, A/V hubs 112, A/V display devices 114, receiver device 116-1 and/or speakers 118 are sometimes referred to as 'electronic devices.'

In particular, portable electronic device 110 and at least one of A/V hubs 112 (such as A/V hub 112-1) may communicate with each other using wireless communication, and one or more other components in system 100 (such as at least: one of A/V display devices 114, receiver device 116-1, one of speakers 118 and/or one of content sources 128) may communicate using wireless and/or wired communication. During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as information specifying communication performance, data, a user interface, A/V content, etc.).

Figure 8:
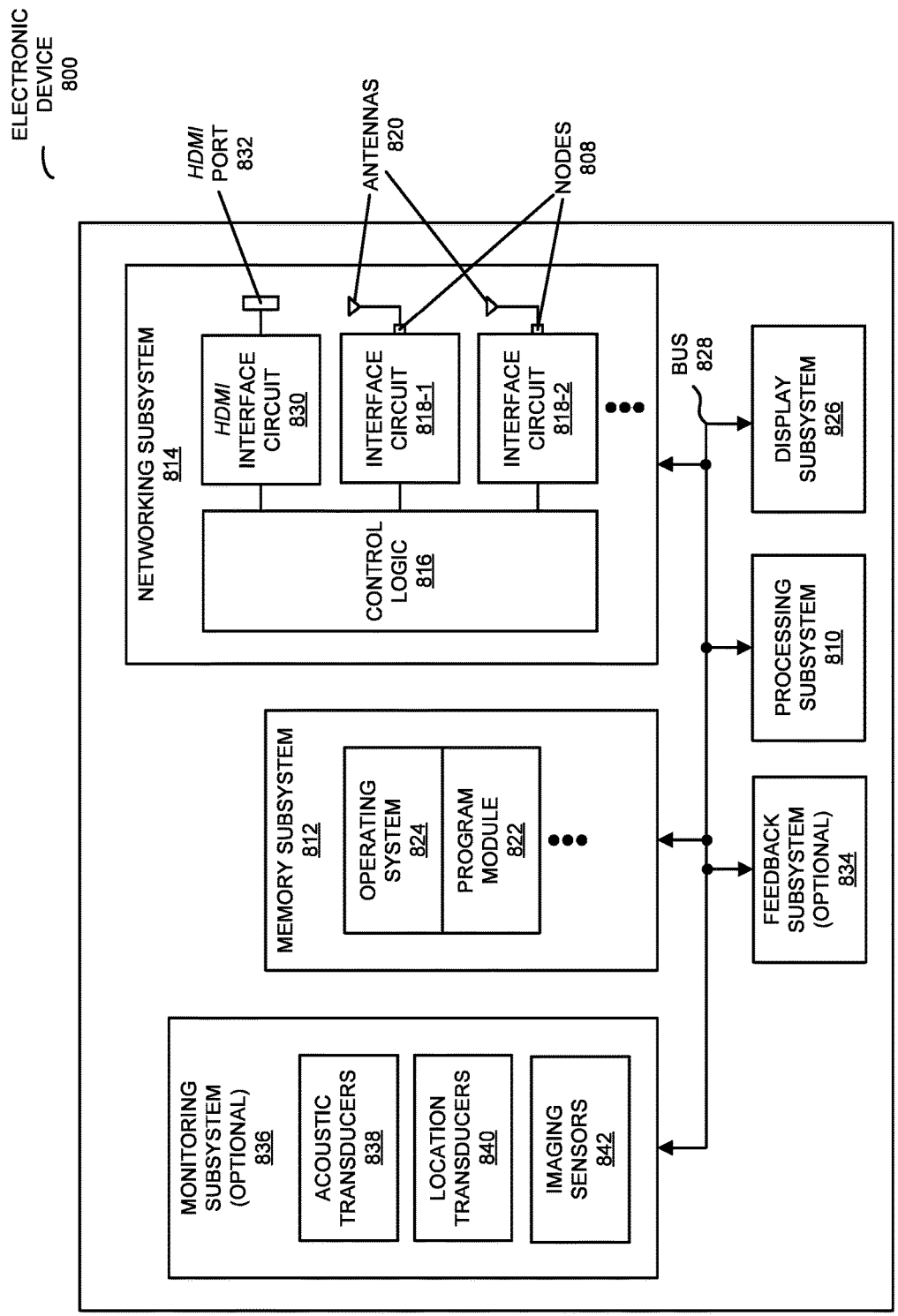
FIG. 8 is a block diagram illustrating one of the electronic devices of FIG. 1 in accordance with an embodiment of the present disclosure.

As described further below with reference to FIG. 8, portable electronic device 110, A/V hubs 112, A/V display devices 114, receiver device 116-1, speakers 118 and content sources 128 may include subsystems, such as: a networking subsystem, a memory subsystem and a processor subsystem. In addition, portable electronic device 110, A/V hubs 112, receiver device 116-1 and/or speakers 118, and optionally one or more of A/V display devices 114 and/or content sources 128, may include radios 120 in the networking subsystems. (For example, a radio or receiver device may be in an A/V display device, e.g., radio 122-5 is included in A/V display device 114-2.) Moreover, note that radios 120 may be instances of the same radio or may be different from each other. More generally, portable electronic device 110, A/V hubs 112, receiver device 116-1 and/or speakers 118 (and optionally A/V display devices 114 and/or content sources 128) can include (or can be included within) any electronic devices with the networking subsystems that enable portable electronic device 110, A/V hubs 112, receiver device 116-1 and/or speakers 118 (and optionally A/V display devices 114 and/or content sources 128) to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 122 (represented by a jagged line) are transmitted from radio 120-1 in portable electronic device 110. These wireless signals may be received by at least: one of A/V hubs 112, receiver device 116-1 and/or at least one of speakers 118 (and, optionally, one or more of A/V display devices 114 and/or content sources 128). For example, portable electronic device 110 may transmit packets. In turn, these packets may be received by a radio 120-2 in A/V hub 112-1. This may allow portable electronic device 110 to communicate information to A/V hub 112-1. While FIG. 1 illustrates portable electronic device 110 transmitting packets, note that portable electronic device 110 may also receive packets from A/V hub 112-1 and/or one or more other components in system 100. More generally, wireless signals may be transmitted and/or received by one or more of the components in system 100.

In the described embodiments, processing of a packet or frame in portable electronic device 110, A/V hubs 112, receiver device 116-1 and/or speakers 118 (and optionally one or more of A/V display devices 114 and/or content sources 128) includes: receiving wireless signals 122 with the packet or frame; decoding/extracting the packet or frame from received wireless signals 122 to acquire the packet or frame; and processing the packet or frame to determine information contained in the packet or frame (such as the information associated with a data stream). For example, the information from portable electronic device 110 may include user-interface activity information associated with a user interface displayed on touch-sensitive display (TSD) 126 in portable electronic device 110, which a user of portable electronic device 110 uses to control at least: one of A/V hubs 112, one of A/V display devices 114, speakers 118 and/or one of content sources 128. (In some embodiments, instead of or in additional to touch-sensitive display 126, portable electronic device 110 includes a user interface with physical knobs and/or buttons that a user can use to control at least: one of A/V hubs 112 one of A/V display devices 114, speakers 118 and/or one of content sources 128.) Alternatively, the information from portable electronic device 110, A/V hubs 112 and/or receiver device 116-1 may specify communication performance about the communication between portable electronic device 110 and one or more other components in system 100. Moreover, the information from A/V hub 112-1 may include device-state information about a current device state of at least one of: A/V display devices 114, speakers 118 and/or one of content sources 128 (such as on, off, play, rewind, fast forward, a selected channel, selected A/V content, a content source, etc.), or may include user-interface information for the user interface (which may be dynamically updated based on the device-state information and/or the user-interface activity information). Furthermore, the information from at least one of A/V hubs 112 and/or one of content sources 128 may include audio and/or video (which is sometimes denoted as 'audio/video' or 'A/V' content) that are displayed or presented on one or more of A/V display devices 114, as well as display instructions that specify how the audio and/or video are to be displayed or presented.

However, as noted previously, the audio and/or video may be communicated between components in system 100 via wired communication. Therefore, as shown in FIG. 1, there may be a wired cable or link, such as a high-definition multimedia-interface (HDMI) cable 124, such as between A/V hub 112-1 and A/V display device 114-3. While the audio and/or video may be included in or associated with HDMI content, in other embodiments the audio content may be included in or associated with A/V content that is compatible with another format or standard is used in the embodiments of the disclosed communication technique. For example, the A/V content may include or may be compatible with: H.264, MPEG-2, a QuickTime video format, MPEG-4, MP4, and/or TCP/IP. Moreover, the video mode of the A/V content may be 720p, 1080i, 1080p, 1440p, 2000, 2160p, 2540p, 4000p and/or 4320p.

Note that one of A/V hubs 112 (such as A/V hub 112-1) may determine display instructions (with a display layout) for the A/V content based on a format of a display in one of A/V display devices 114, such as A/V display device 114-1. Alternatively, A/V hub 112-1 can use pre-determined display instructions or A/V hub 112-1 can modify or transform the A/V content based on the display layout so that the modified or transformed A/V content has an appropriate format for display on the display. Moreover, the display instructions may specify information to be displayed on the display in A/V display device 114-1, including where A/V content is displayed (such as in a central window, in a tiled window, etc.). Consequently, the information to be displayed (i.e., an instance of the display instructions) may be based on a format of the display, such as: a display size, display resolution, display aspect ratio, display contrast ratio, a display type, etc. Furthermore, note that when A/V hub 112-1 receives the A/V content from one of content sources 128, A/V hub 112-1 may provide the A/V content and display instructions to A/V display device 114-1 as frames with the A/V content are received from one of content sources 128 (e.g., in real time), so that the A/V content is displayed on the display in A/V display device 114-1. For example, A/V hub 112-1 may collect the A/V content in a buffer until a frame is received, and then A/V hub 112-1 may provide the complete frame to A/V display device 114-1. Alternatively, A/V hub 112-1 may provide packets with portions of a frame to A/V display device 114-1 as they are received. In some embodiments, the display instructions may be provided to A/V display device 114-1 differentially (such as when the display instructions change), regularly or periodically (such as in one of every N packets or in a packet in each frame) or in each packet.

Moreover, note that the communication between portable electronic device 110, one or more of A/V hubs 112, one or more of A/V display devices 114, receiver device 116-1, one or more of speakers 118 and/or one or more of content sources 128 may be characterized by a variety of performance metrics, such as: a received signal strength indicator (RSSI), a data rate, a data rate discounting radio protocol overhead (which is sometimes referred to as a 'throughput'), an error rate (such as a packet error rate, or a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization'). Moreover, the performance during the communication associated with different channels may be monitored individually or jointly (e.g., to identify dropped packets).

The communication between portable electronic device 110, one or more of A/V hubs 112, A/V display devices 114, receiver device 116-1, one or more of speakers 118 and/or one or more of content sources 128 in FIG. 1 may involve one or more independent, concurrent data streams in different wireless channels (or even different communication protocols, such as different Wi-Fi communication protocols) in one or more connections or links, which may be communicated using multiple radios. Note that the one or more connections or links may each have a separate or different identifier (such as a different service set identifier) on a wireless network in system 100 (which may be a proprietary network or a public network). Moreover, the one or more concurrent data streams may, on a dynamic or packet-by-packet basis, be partially or completely redundant to improve or maintain the performance metrics even when there are transient changes (such as interference, changes in the amount of information that needs to be communicated, movement of portable electronic device 110, etc.), and to facilitate services (while remaining compatible with the communication protocol, e.g., a Wi-Fi communication protocol) such as: channel calibration, determining of one or more performance metrics, performing quality-of-service characterization without disrupting the communication (such as performing channel estimation, determining link quality, performing channel calibration and/or performing spectral analysis associated with at least one channel), seamless handoff between different wireless channels, coordinated communication between components, etc. These features may reduce the number of packets that are resent, and, thus, may decrease the latency and avoid disruption of the communication and may enhance the experience of one or more users that are viewing A/V content on one or more of A/V display devices 114 and/or listening to audio output by one or more of speakers 118.

As noted previously, a user may control at least one of A/V hubs 112 (such as A/V hub 112-1), one of A/V display devices 114, one of speakers 118 and/or one of content sources 128 via the user interface displayed on touch-sensitive display 126 on portable electronic device 110. In particular, at a given time, the user interface may include one or more virtual icons that allow the user to activate, deactivate or change functionality or capabilities of at least: one of A/V hub 112-1, one of A/V display devices 114, one of speakers 118 and/or one of content sources 128. For example, a given virtual icon in the user interface may have an associated strike area on a surface of touch-sensitive display 126. If the user makes and then breaks contact with the surface (e.g., using one or more fingers or digits, or using a stylus) within the strike area, portable electronic device 110 (such as a processor executing a program module) may receive user-interface activity information indicating activation of this command or instruction from a touch-screen input/output (I/O) controller, which is coupled to touch-sensitive display 126. (Alternatively, touch-sensitive display 126 may be responsive to pressure. In these embodiments, the user may maintain contact with touch-sensitive display 126 with an average contact pressure that is usually less than a threshold value, such as 10-20 kPa, and may activate a given virtual icon by increase the average contact pressure with touch-sensitive display 126 above the threshold value.) In response, the program module may instruct an interface circuit in portable electronic device 110 to wirelessly communicate the user-interface activity information indicating the command or instruction to A/V hub 112-1, and A/V hub 112-1 may communicate the command or the instruction to the target component in system 100 (such as A/V display device 114-1). This instruction or command may result in A/V display device 114-1 turning on or off, displaying A/V content from a particular content source, performing a trick mode of operation (such as fast forward, reverse, fast reverse or skip), etc. For example, A/V hub 112-1 may request the A/V content from content source 128-1, and then may provide the A/V content to along with display instructions to A/V display device 114-1, so that A/V display device 114-1 displays the A/V content. Alternatively or additionally, A/V hub 112-1 may provide audio content associated with video content from content source 128-1 to one or more of speakers 118.

Subsequently, the user may move or change environments or locations. For example, the user may move within a room that includes more than one of A/V display devices 114 or may move from one room to another room (and there may be a different one of A/V display devices 114 in this new room). It can be time consuming and frustrating for the user to use the user interface on portable electronic device 110 to discontinue the display of the A/V content on A/V display device 114-1, and then restart it on another of one of A/V display devices 114 that is proximate to or included in their new environment or location. Similarly, if the user has not been recently viewing A/V content, and the user moves into proximity of one of A/V display devices 114, it can be time consuming and frustrating for the user to use the user interface on portable electronic device 110 to initiate the display of the A/V content on one of A/V display devices 114.

This challenge is addressed in the communication technique by directly or indirectly determining the environment of portable electronic device 110, and then using the determined environment in conjunction with history of user behavior associated with at least one of A/V hubs 112 (such as A/V content viewed using A/V hub 112-1 as a function of location, environment and/or timestamp) to automatically (i.e., without user action, such as without the user activating a virtual command icon in the user interface) turn on one of A/V display devices 114 that is proximate to the user and to automatically display A/V content on this A/V display device (e.g., by requesting the A/V content from one of content sources 128, and providing the A/V content and display instructions to the one of A/V display devices 114). Note that an 'environment' may include a region within a room that is closest to a particular one of A/V display devices 114 or a room that includes the particular one of one of A/V display devices 114. In the former case, the 'region' is defined by geographic proximity to the one of A/V display devices 114, while in the latter case the 'region' is defined by the physical layout of a room that includes the one of A/V display devices 114.

For example, the environment (such as a room in a building or a location in a room in a building) may, at least in part, be determined directly using techniques such as triangulation and/or trilateration in a local positioning system, global positioning system, a wireless network (such as a cellular-telephone network or a WLAN). In particular, the location may be determined coarsely (e.g., to the nearest room, 3-10 m accuracy, etc.) or finely (e.g., 0.1-3 m accuracy) using triangulation and/or trilateration.

Alternatively or additionally, in some embodiments the environment is determined indirectly based on communication among electronic devices in system 100. In particular, instead of set-top boxes, the receiver devices may be located proximate to (or, in some embodiments, included in) corresponding A/V display devices 114, and a given receiver device (such as receiver device 116-1) may be a local wireless receiver that is associated with A/V hub 112-1. Thus, receiver device 116-1 may receive frame-by-frame transcoded video content from A/V hub 112-1 for display on A/V display device 114-1. As described further below with reference to FIGS. 2 and 3, the receiver devices may communicate with portable electronic device 110, and one or more performance metrics for the communication (which are sometimes referred to as 'performance information') may be provided by portable electronic device 110 and/or the receiver devices to A/V hub 112-1. Then, A/V hub 112-1 may, at least in part, use the one or more performance metrics to indirectly determine the environment of portable electronic device 110. Note that the indirectly determined environment may be quantitative or qualitative, such as an indication as to which of A/V display devices 114, e.g., A/V display device 114-1, is closest to portable electronic device 110. Therefore, determining the environment may or may not involve determining the location of portable electronic device 110.

In some embodiments (as described further below with reference to FIGS. 4 and 5), instead of using performance metrics for the communication between the receiver devices and portable electronic device 110, the performance metrics may be for communication between portable electronic device 110 and at least one of the receiver devices and for communication between portable electronic device 110 and at least one of A/V hubs 112. Then, portable electronic device 110, at least one of the receiver devices, and/or at least one of A/V hubs 112 may provide the performance metrics to A/V hub 112-1, which, at least in part, uses this information to determine the environment of portable electronic device 110 (and, thus, of the user).

Furthermore, in some embodiments the environment may be determined based, at least in part, on sound measured using one or more acoustic transducers (e.g., a microphone), such as one or more acoustic transducers in at least one of: A/V hubs 112, A/V display devices 114, receiver device 116-1, and/or speakers 118. For example, the one or more acoustic transducers may detect sound associated with the individual (which may involve voice-based identification of the individual) and/or may detect sound that is characteristic of the environment (such as background or ambient noise, e.g., acoustic modes that are associated with the environment). Alternatively or additionally, in some embodiments the environment may be determined based, at least in part, on one or more images that acquired in the environment by one or more imaging sensors (or cameras), such as one or more imaging sensors in at least one of: A/V hubs 112, A/V display devices 114, receiver device 116-1, and/or speakers 118. For example, the one or more imaging sensors may detect the presence of and/or identify an individual in the environment (such as by using face recognition or another biometric-identification technique). Thus, in some embodiments the environment may be determined without portable electronic device 110 (e.g., portable electronic device 110 may not be proximate to the individual).

Once the environment and, thus, the nearest one of A/V display devices 114 is determined, A/V hub 112-1 may provide an instruction to A/V display device 114-1 (either directly or via receiver device 116-1) to power on A/V display device 114-1 (i.e., to transition from an 'off' state or a 'standby' state to an 'on' state), and then may provide A/V content (from one of content sources 128) for display on A/V display device 114-1, such as based on display instructions that are also provided by A/V hub 112-1.

In addition to using triangulation, trilateration and/or the performance metrics, the environment of portable electronic device 110 may, at least in part, be determined based on a user history or a history of user behaviors associated with A/V hub 112-1 (such as, as a function of timestamps, e.g., time and/or day, A/V content that was perused, selected, and/or viewed, previous locations or environments of portable electronic device 110, etc.). For example, the user history or the history of user behaviors may indicate that the user views sports (such as football) from a particular room in a home on Sunday afternoons based on the approximate position or location in a room or building of portable electronic device 110 (which is associated with the user). Thus, the user history or the history of user behaviors may specify the environment (e.g., the room in the home) for particular timestamps (e.g., Sunday afternoon) and for particular types of A/V content (e.g., sports), as well as the A/V display device that was used (such as A/V display device 114-1). If on a Sunday afternoon or at another day and/or time, the user starts watching a sporting event on another of A/V display devices 114 in a different environment in the home (such as another room) and the user moves into the room (as determined based on communication with portable electronic device 110 that the user brought with them), then A/V hub 112-1 may turn on A/V display device 114-1 and may provide the A/V content (the sporting event), as well as display instructions, to A/V display device 114-1. Alternatively or additionally, based on communication with portable electronic device 110, A/V hub 112-1 may be unsure if the user is in a room with A/V display device 114-1 or an adjacent room with A/V device 114-2 (e.g., A/V hub 112-1 may not be able to determine the environment accurately based solely on the communication) However, because it is a Sunday afternoon and/or based on content schedule (such as a broadcast schedule), A/V hub 112-1 may conclude that the user is likely in the room to watch sports, and may turn on A/V display device 114-1 and may provide the appropriate A/V content to A/V display device 114-1, as well as display instructions. Furthermore, based on communication with portable electronic device 110, A/V hub 112-1 may determine that the user is in a room that includes a kitchen area with A/V display device 114-1 and a dining room area with A/V display device 114-2. However, based on the time of day (e.g., the morning), A/V hub 112-1 may conclude that the user is more likely to proximate to the kitchen area with A/V display device 114-1.

If A/V hub 112-1 is unable to conclusively determine the environment of portable electronic device 110 (e.g., the confidence or probability that the determination is correct is less than a threshold value, such as 70, 80, 90, 95 or 99%), A/V hub 112-1 may provide instructions for a revised user interface to portable electronic device 110 that requests that the user specify the environment of portable electronic device 110 or may instruct portable electronic device 110 to generate the revised user interface. (Alternatively, A/V hub 112-1 or portable electronic device 110 may select a predetermined or a predefined user interface.) Portable electronic device 110 may display the revised user interface on a display, and may provide information to A/V hub 112-1 that specifies the answer received from the user. For example, in response to a question in the user interface about the current environment, the user may: enter the current environment, select from two or more potential environments, provide feedback about the current environment that A/V hub 112-1 identified (such as whether the identified current environment is correct), etc.

This approach may allow the environment of portable electronic device 110 (and, thus, environment-based services) to be provided by A/V hub 112-1 even in crowded or noisy communication environments, such as environments with interference, and/or indoors, where the signal-to-noise ratio may be reduced or where it may be difficult to receive signals from a global positioning system. Moreover, by automatically turning on A/V display device 114-1 and/or displaying A/V content that is of interest to the user (such as A/V content that the user was recently watching on another of A/V display devices 114), the communication technique may reduce or eliminate the user effort needed to select and display A/V content as the user moves within a room or in a building (and, more generally, in one or more environments). Consequently, the communication technique may reduce user frustration and, by providing this value-added service, may improve user satisfaction when using portable electronic device 110, A/V hubs 112, A/V display devices 114, and/or speakers 118.

While the preceding examples illustrated automatic turning on of one of A/V display devices 114 and the display of A/V content, in other embodiments the communication technique may be used to turn on and/or provide content to one or more of speakers 118. For example, based on the identified environment and a user's recent or previous behaviors, certain music or types of music may be automatically played on one or more of speakers 118 in the environment. Moreover, if the individual transitions from a first environment that included an A/V display device (which they may have used to view particular A/V content, such as a movie or a television show) to a second environment that does not include an A/V display device (but which does include one or more speakers), the communication technique may be used to automatically play audio content from or related to the A/V content on the one or more speakers in the second environment. In this way, the communication technique may be generalized based on the available capabilities in the identified environment.

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving packets or frames. While portable electronic device 110, A/V hubs 112, A/V display devices 114 and speakers 118 are illustrated with a single instance of radios 120, in other embodiments portable electronic device 110 and A/V hubs 112, and optionally A/V display devices 114, speakers 118 and/or content sources 128, may include multiple radios.

Figure 2:
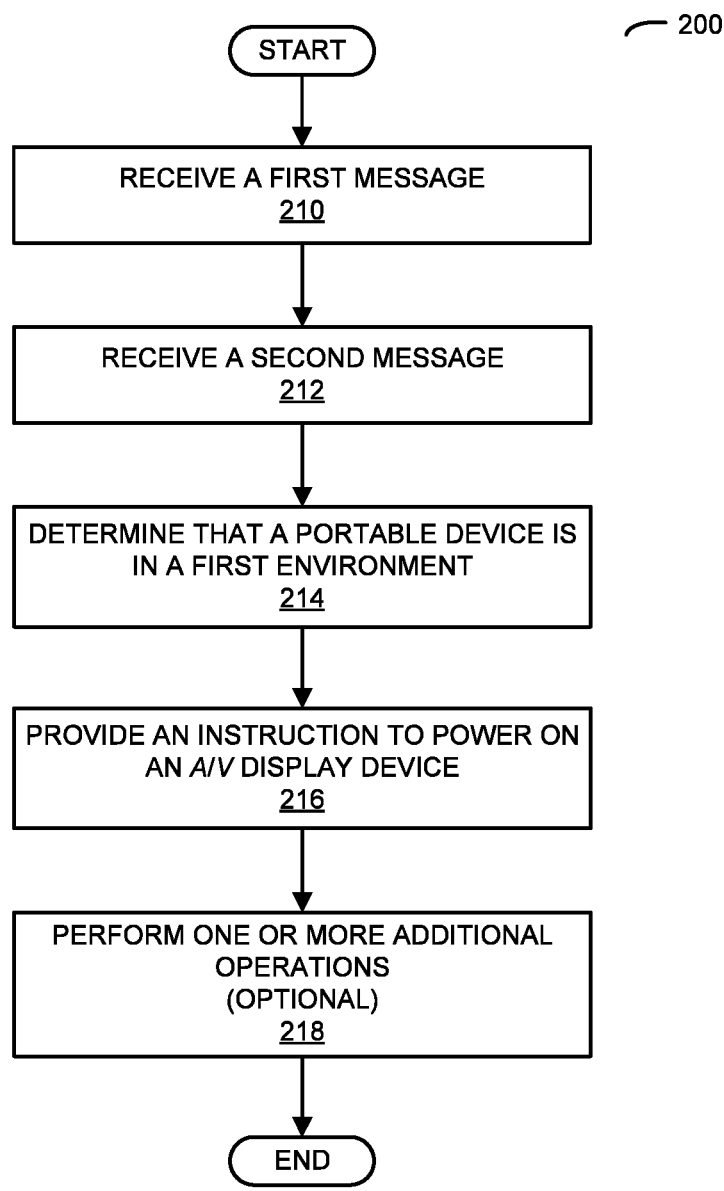
FIG. 2 is a flow diagram illustrating a method for determining an environment of a portable electronic device in accordance with an embodiment of the present disclosure.

We now describe embodiments of the communication technique. FIG. 2 presents a flow diagram illustrating a method 200 for determining an environment of a portable electronic device, which may be performed by an A/V hub, such as one of A/V hubs 112 (FIG. 1). During operation, the A/V hub (such as a control mechanism, a control circuit or control logic, e.g., a processor executing a program module and/or or a circuit) receives, via an interface circuit in the A/V hub, a first message (operation 210) from a first receiver device with first performance information about communication between the first receiver device and a portable electronic device. Then, the A/V hub receives, via the interface circuit, a second message (operation 212) from a second receiver device with second performance information about communication between the second receiver device and the portable electronic device. For example, given performance information in the first performance information and the second performance information may include: RSSI (such as the RSSI received by the portable electronic device from a given receiver device, which was then communicated to the given receiver device, or the RSSI received from the portable electronic device by the given receiver device), a signal-to-noise ratio, a throughput, a packet error rate, and/or time-of-flight information for the communication between the given receiver device and the portable electronic device.

Moreover, the A/V hub determines that the portable electronic device is in a first environment (operation 214), instead of the second environment, based on the first performance information, the second performance information, and a history of behavior of an individual associated with the portable electronic device and the A/V hub. In some embodiments, the determination (operation 214) is based on a comparison of the first performance information and the second performance information. For example, the first and the second performance information may include RSSIs, and the A/V hub may determine that a larger RSSI for communication between the portable electronic device and a particular receiver device indicates that the portable electronic device is closer to the particular receiver device. Note that the comparison may be corrected based on predetermined characteristics of the first and/or the second environments, such as electromagnetic or wireless characteristics (e.g., a correction for interference or a multipath signal). Alternatively or additionally, the determination (operation 214) may be based on a location of the portable electronic device, which is determined based, at least in part, on the first performance information and the second performance information. For example, a predetermined or predefined dependence of the RSSI on distance from a given receiver device (such as because of path loss) may be used to estimate the distances of the portable electronic device from the first receiver device and the second receiver device. Based on the estimated distances, the environment of the portable electronic device may be determined (operation 214).

Next, the A/V hub provides, via the interface circuit, an instruction to power on an A/V display device (operation 216) in the first environment based on the determination. For example, powering on the A/V display device may involve transitioning the A/V display device from an 'off' state or a 'standby' state into an 'on' state.

Note that the first receiver device may be in the first environment and the second receiver device may be in a second environment. For example, the first environment and the second environment may be in a room in a building or may be in different, adjacent rooms in the building (such as adjacent rooms on the same or different floors in the building).

In some embodiments, the A/V hub optionally performs one or more additional operations (operation 218). For example, when the determination (operation 214) is inconclusive, the A/V hub may provide a question (or instructions for the question or information that specifies the question) to the portable electronic device for the individual to specify the environment of the portable electronic device. Furthermore, the A/V hub may provide (directly or via the first receiver device) A/V content to the A/V display device based on the history of behavior of the individual associated with the A/V hub. Alternatively, the A/V hub may transcode the A/V content for the individual based on a format of the A/V display device, and the A/V hub may provide (directly or via the first receiver device) the transcoded A/V content to the A/V display device for display.

Figure 3:
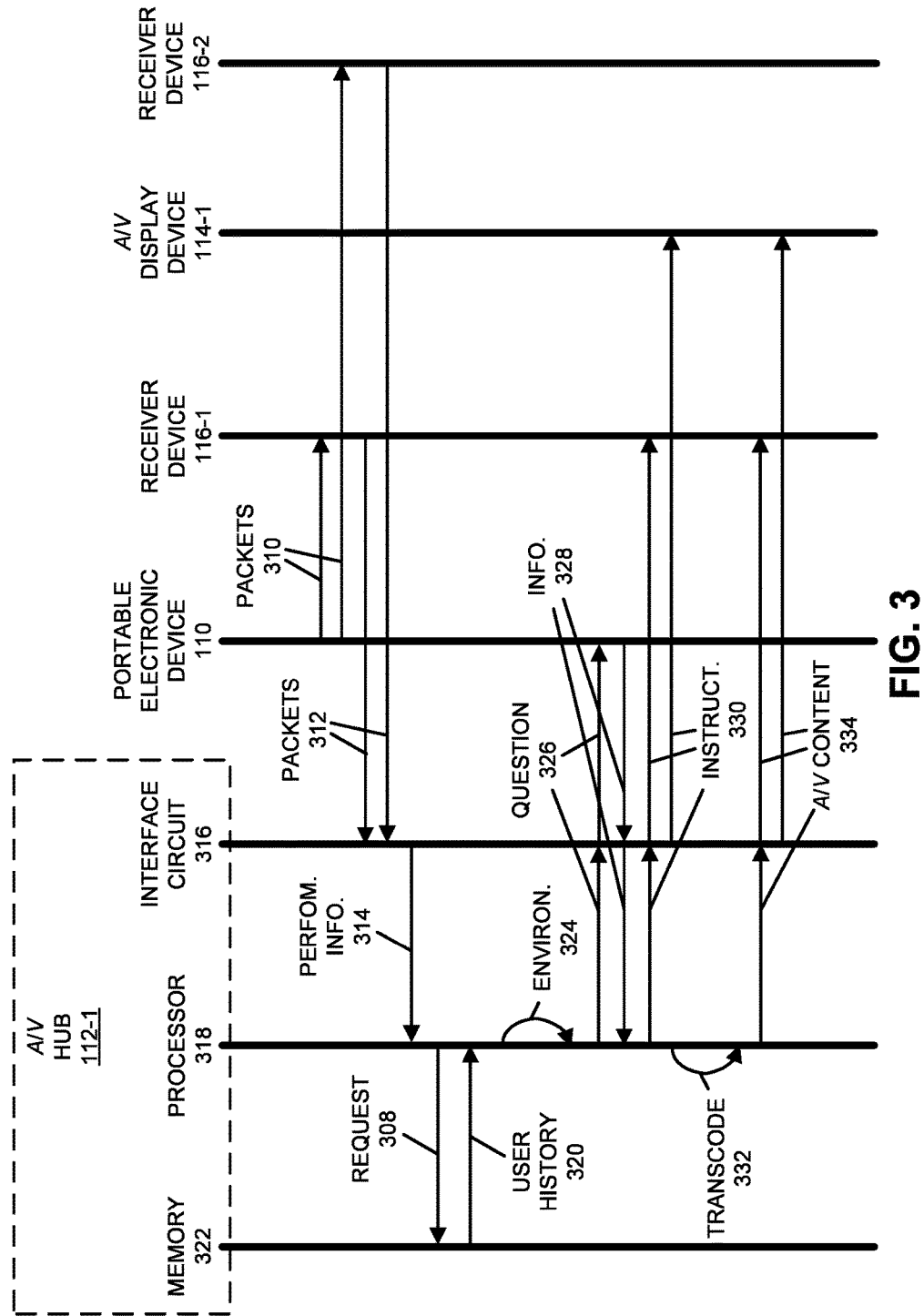
FIG. 3 is a drawing illustrating communication among the electronic devices in FIG. 1 in accordance with an embodiment of the present disclosure.

FIG. 3 is a drawing illustrating communication among portable electronic device 110, A/V hub 112-1, A/V display device 114-1 and receiver devices 116. In particular, receiver devices 116 may communicate with portable electronic device 110. For example, portable electronic device 110 may transmit packets 310 to receiver devices 116. In response, receiver devices 116 may transmit packets 312 to A/V hub 112-1 with performance information 314 about the communication with portable electronic device 110.

After receiving performance information 314, interface circuit 316 may provide performance information 314 to processor 318. Then, processor 318 may access at least a portion of user history 320 for a user or an individual that is associated with portable electronic device 110. This user history may be stored in memory 322, and may include a record of locations of portable electronic device 110 and A/V content the user viewed using A/V hub 112-1 as a function of time. Processor 318 may access the user history for the user based on an identifier of portable electronic device 110 (such as a media access control address) or an identifier of the user, which was included with in the packets with performance information 314. For example, processor 318 may provide a request 308 with the identifier.

Next, processor 318 may determine that portable electronic device 110 is in environment 324 (such as a room or a portion of a room) based on performance information 314 and user history 320. If the determination is inconclusive, processor 318 may provide, via interface circuit 316, a question 326 to portable electronic device 110 so the user can provide information 328 that specifies environment 324.

Furthermore, processor 318 may provide, via interface circuit 316, an instruction 330 to power on A/V display device 114-1 in the determined or specified environment 324. This instruction may be provided directly to A/V display device 114-1 or via receiver device 116-1. Additionally, processor 318 may provide A/V content 334 (as well as optional display instructions) to A/V display device 114-1 based on user history 320. Once again, A/V content 334 may be provided directly to A/V display device 114-1 or via receiver device 116-1. In some embodiments, prior to providing A/V content 334, processor 318 may transcode A/V content 332 based on a format of A/V display device 114-1.

Figure 4:
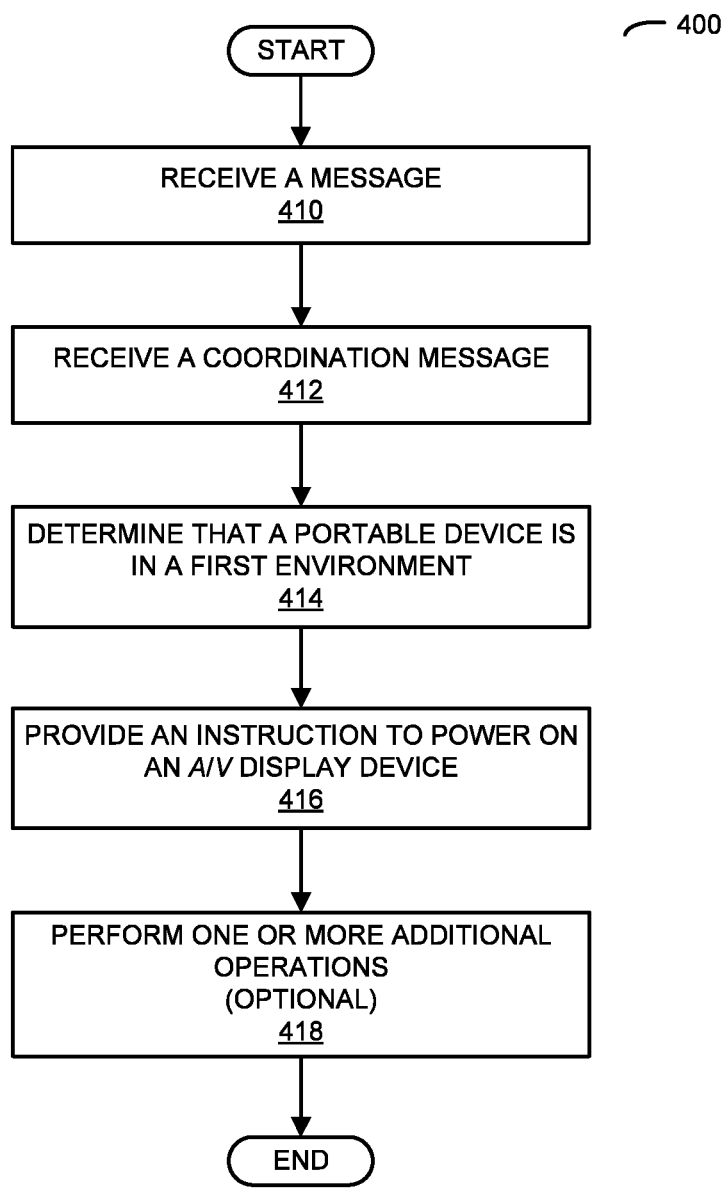
FIG. 4 is a flow diagram illustrating a method for determining an environment of a portable electronic device in accordance with an embodiment of the present disclosure.

As discussed previously, in another embodiment the A/V hub determines the environment of the portable electronic device based, at least in part, on performance information for communication between the portable electronic device and one or more other components. This is shown in FIG. 4, which presents a flow diagram illustrating a method 400 for determining an environment of a portable electronic device. This method may be performed by an A/V hub, such as one of A/V hubs 112 (FIG. 1). During operation, the A/V hub (such as a control mechanism, a control circuit or control logic, e.g., a processor executing a program module and/or or a circuit) receives, via an interface circuit in the A/V hub, a message (operation 410) from the portable electronic device with first performance information about communication between the portable electronic device and the A/V hub. Then, the A/V hub receives, via the interface circuit, a coordination message (operation 412) from a second A/V hub with second performance information about communication between the portable electronic device and the second A/V hub. For example, given performance information in the first performance information and the second performance information may include: RSSI (such as the RSSI received by the portable electronic device from a given A/V hub or vice versa), a signal-to-noise ratio, a throughput, a packet error rate, and/or time-of-flight information for the communication between a given A/V hub and the portable electronic device.

Moreover, the A/V hub determines that the portable electronic device is in a first environment (operation 414), instead of the second environment, based on the first performance information, the second performance information, and a history of behavior of an individual associated with the portable electronic device and the A/V hub. In some embodiments, the determination (operation 414) is based, at least in part, on a comparison of the first performance information and the second performance information. For example, the first and the second performance information may include RSSIs, and the A/V hub may determine that a larger RSSI for communication between the portable electronic device and a particular A/V hub indicates that the portable electronic device is closer to the particular A/V hub. Note that the comparison may be corrected based on predetermined characteristics of the first and/or the second environments, such as electromagnetic or wireless characteristics (e.g., a correction for interference or a multipath signal). Alternatively or additionally, the determination (operation 414) may be based on a location of the portable electronic device, which is determined based on the first performance information and the second performance information. For example, a predetermined or predefined dependence of the RSSI on distance from a given A/V hub (such as because of path loss) may be used to estimate the distances of the portable electronic device from the A/V hub and the second A/V hub. Based on the estimated distances, the environment of the portable electronic device may be determined (operation 414).

Next, the A/V hub provides, via the interface circuit, an instruction to power on an A/V display device (operation 416) in the first environment based on the determination. For example, powering on the A/V display device may involve transitioning the A/V display device from an 'off' state or a 'standby' state into an 'on' state.

Note that the first receiver device may be in the first environment and the second receiver device may be in a second environment. For example, the first environment and the second environment may be in a room in a building or may be in different, adjacent rooms in the building (such as adjacent rooms on the same or different floors in the building).

In some embodiments, the A/V hub optionally performs one or more additional operations (operation 418). For example, when the determination (operation 414) is inconclusive, the A/V hub may provide a question (or instructions for the question or information that specifies the question) to the portable electronic device for the individual to specify the environment of the portable electronic device. Furthermore, the A/V hub may provide (directly or via the first receiver device) A/V content to the A/V display device based on the history of behavior of the individual associated with the A/V hub. Alternatively, the A/V hub may transcode the A/V content for the individual based on a format of the A/V display device, and the A/V hub may provide (directly or via the first receiver device) the transcoded A/V content to the A/V display device for display.

Figure 5:
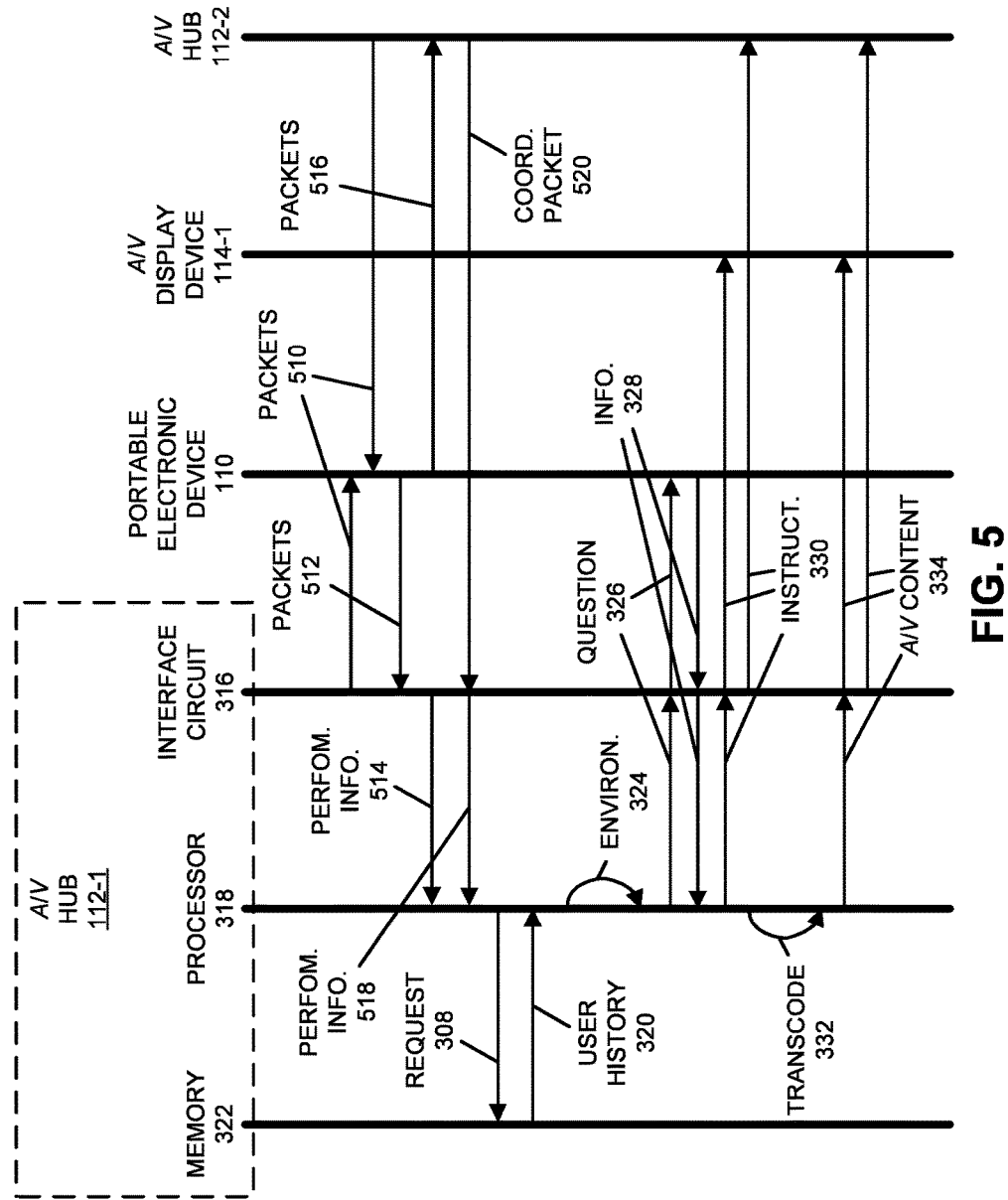
FIG. 5 is a drawing illustrating communication among the electronic devices in FIG. 1 in accordance with an embodiment of the present disclosure.

FIG. 5 is a drawing illustrating communication among portable electronic device 110, A/V hubs 112-1 and 112-2, and A/V display device 114-1. In particular, A/V hubs 112 may communicate with portable electronic device 110. For example, A/V hubs 112 may transmit packets 510 to portable electronic device 110. In response, portable electronic device 110 may transmit packet 512 to A/V hub 112-1 with performance information 514 about the communication with portable electronic device 110, and may transmit packet 516 to A/V hub 112-2 with performance information 518 about the communication with portable electronic device 110. In addition, A/V hub 112-2 may then transmit a coordination packet 520 to A/V hub 112-1 with performance information 518.

After receiving performance information 514 and 518, interface circuit 316 may provide performance information 514 and 518 to processor 318. Then, processor 318 may access user history 320 for a user or an individual that is associated with portable electronic device 110. This user history may be stored in memory 322, and may include a record of locations of portable electronic device 110 and A/V content the user viewed using A/V hub 112-1 as a function of time. Processor 318 may access the user history for the user based on an identifier of portable electronic device 110 (such as a media access control address) or an identifier of the user, which was included with in the packets or messages with performance information 514 and 518. For example, processor 318 may provide a request 308 with the identifier.

Next, processor 318 may determine that portable electronic device 110 is in environment 324 (such as a room or a portion of a room) based on performance information 514 and 518 and user history 320. If the determination is inconclusive, processor 318 may provide, via interface circuit 316, a question 326 to portable electronic device 110 so the user can provide information 328 that specifies environment 324.

Furthermore, processor 318 may provide, via interface circuit 316, an instruction 330 to power on A/V display device 114-1 in the determined or specified environment 324. Additionally, processor 318 may provide A/V content 334 (as well as optional display instructions) to A/V display device 114-1 based on user history 320. In some embodiments, prior to providing A/V content 334, processor 318 may transcode A/V content 332 based on a format of A/V display device 114-1.

Figure 6:
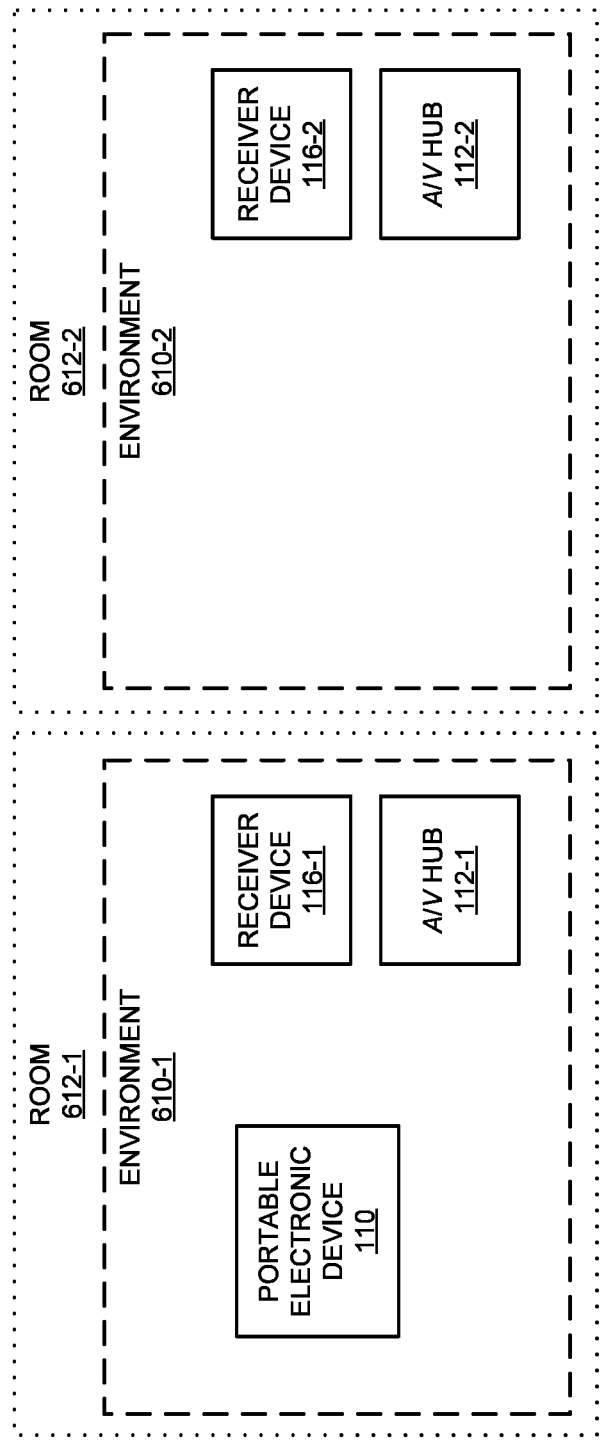
FIG. 6 is a drawing illustrating the determination of an environment of a portable electronic device in accordance with an embodiment of the present disclosure.
Figure 7:
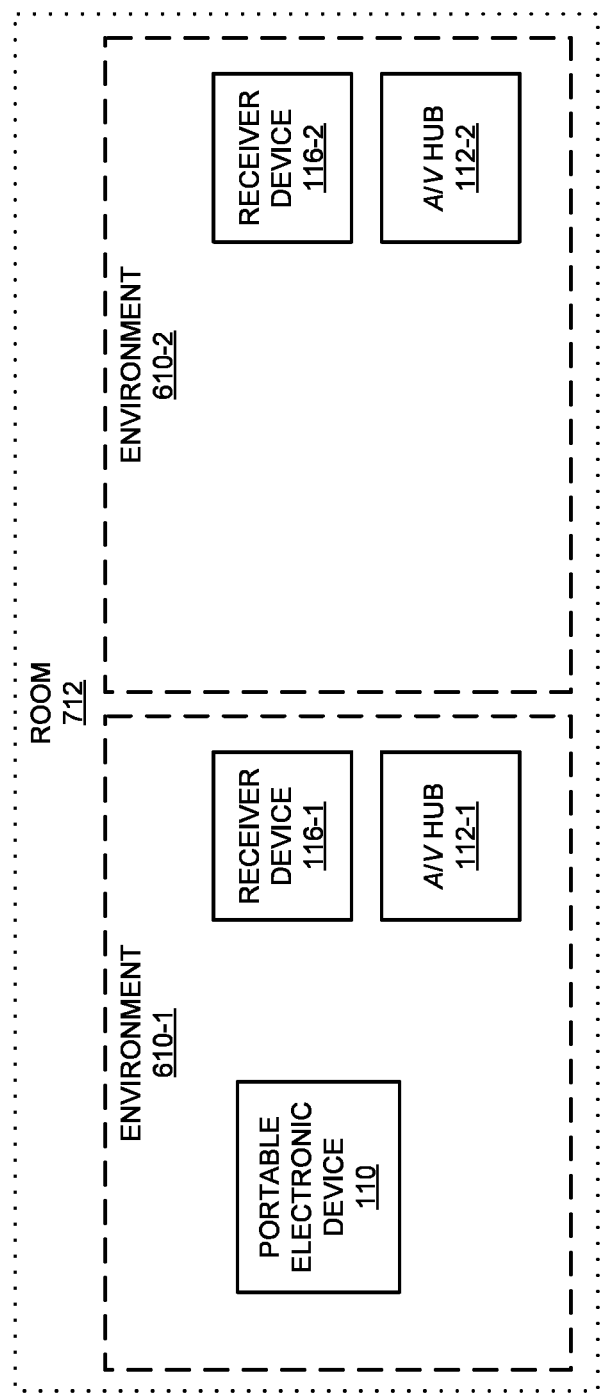
FIG. 7 is a drawing illustrating the determination of an environment of a portable electronic device in accordance with an embodiment of the present disclosure.

In an exemplary embodiment, the communication technique is used to determine the environment of a portable electronic device and, thus, an associated user. This is shown in FIG. 6, which presents a drawing illustrating the determination of an environment of portable electronic device 110. In particular, portable electronic device 110 may communicate with receiver devices 116 and/or A/V hubs 112 in environments 610, such as adjacent rooms 612 in a building. Alternatively, as shown in FIG. 7, which presents a drawing illustrating the determination of an environment of portable electronic device 110, environments 710 may be in different portions or regions in a room 712 in a building. In either of these examples, based on the performance information and the history of user behavior, A/V hub 112-1 may determine that portable electronic device 110 is in environment 610-1.

While methods 200 (FIG. 2) and 400 illustrated the communication technique with performance information associated with or for the communication between the portable electronic device and particular components, in other embodiments the performance information is associated with or for the communication between the portable electronic device and other components. In general, the environment may be determined based, at least in part, on performance information associated with or for the communication between the portable electronic device and at least two components, one in the first environment and the other in the second environment. However, as noted previously, in some embodiments the environment is determined based, at least in part, on measured sound and/or one or more images. Thus, in some embodiments the environment may be determined without communication between portable electronic device 110, A/V hubs 112 and/or receiver devices 116.

In some embodiments of methods 200 (FIG. 2) and/or 400 (FIG. 4) there are additional or fewer operations. For example, A/V hub 112-1 may determine the performance information associated with the communication with portable electronic device 110 directly (i.e., without receiving the performance information from portable electronic device 110). Moreover, the order of the operations may be changed, and/or two or more operations may be combined into a single operation. Furthermore, one or more operations may be modified.

We now describe embodiments of an electronic device. FIG. 8 presents a block diagram illustrating an electronic device 800, such as portable electronic device 110, one of A/V hubs 112, one of A/V display devices 114, receiver device 116-1 or one of speakers 118 in FIG. 1. This electronic device includes processing subsystem 810, memory subsystem 812, networking subsystem 814 optional feedback subsystem 834 and optional monitoring subsystem 836. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs). One or more of these components in processing subsystem are sometimes referred to as a 'control mechanism' or a 'control circuit.'

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program module 822 or operating system 824), which may be executed by processing subsystem 810. Note that the one or more computer programs or program modules may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, interface circuits 818 and associated antennas 820. (While FIG. 8 includes antennas 820, in some embodiments electronic device 800 includes one or more nodes, such as nodes 808, e.g., pads, which can be coupled to antennas 820. Thus, electronic device 800 may or may not include antennas 820.) For example, networking subsystem 814 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 818 and at least one of antennas 820 may constitute a radio. In some embodiments, networking subsystem 814 includes a wired interface, such as HDMI interface 830.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, networking subsystem 814 optional feedback subsystem 834 and optional monitoring subsystem 836 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or or electro-optical connections among the subsystems.

In some embodiments, electronic device 800 includes a display subsystem 826 for displaying information on a display (such as a request to clarify an identified environment), which may include a display driver, an I/O controller and the display. Note that a wide variety of display types may be used in display subsystem 826, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon.

Furthermore, optional feedback subsystem 834 may include one or more sensor-feedback mechanisms or devices, such as: a vibration mechanism or a vibration actuator (e.g., an eccentric-rotating-mass actuator or a linear-resonant actuator), a light, one or more speakers, etc., which can be used to provide feedback to a user of electronic device 800 (such as sensory feedback). Alternatively or additionally, optional feedback subsystem 2334 may be used to provide a sensory input to the user. For example, the one or more speakers may output sound, such as audio. Note that the one or more speakers may include an array of transducers that can be modified to adjust a characteristic of the sound output by the one or more speakers, such as a phased-array of acoustic transducers. This capability may allow the one or more speakers to modify the sound in an environment to achieve a desired acoustic experience for a user, such as by changing equalization or spectral content, phase and/or a direction of the propagating sound waves.

In some embodiments, optional monitoring subsystem 836 includes one or more acoustic transducers 838 (such as one or more microphones, a phased-array, etc.) that monitor sound in the environment that includes electronic device 800. The acoustic monitoring may allow electronic device 800 to acoustically characterize the environment, acoustically characterize sound output by speakers in the environment (such as sound corresponding to audio content), determine locations of one or more people (such as a listener), determine locations of one or more speakers in the environment and/or measure sound from one or more speakers that correspond to one or more acoustic-characterization patterns (which may be used to coordinate playback of audio content). Additionally, optional monitoring subsystem 836 may include location transducers 840 that can be used to determine locations of one or more listeners or one or more electronic devices (such as one or more speakers) in the environment. Moreover, optional monitoring subsystem 836 may include one or more imaging sensors 842 that capture one or more monoscopic or stereoscopic images of the environment, and which can be used to characterize the environment (such as the geometry or size of the environment, placement of objects, e.g., furniture, in the environment, a number of people in the environment, and/or a state of a covering or an opening in the environment, e.g., a door, a window, curtains, etc.) and/or to determine locations of one or more people or speakers in the environment.

Electronic device 800 can be (or can be included in) any electronic device with at least one network interface. For example, electronic device 800 can be (or can be included in): a desktop computer, a laptop computer, a subnotebook/netbook, a server, a tablet computer, a smartphone, a cellular telephone, a smartwatch, a consumer-electronic device (such as a television, a set-top box, audio equipment, video equipment, etc.), a remote control, a portable computing device, an access point, a router, a switch, communication equipment, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Moreover, while one of antennas 820 is shown coupled to a given one of interface circuits 818, there may be multiple antennas coupled to the given one of interface circuits 818. For example, an instance of a 3×3 radio may include three antennas. Additionally, one or more of the subsystems may not be present in electronic device 800. Furthermore, in some embodiments, electronic device 800 may include one or more additional subsystems that are not shown in FIG. 8. Also, although separate subsystems are shown in FIG. 8, in some embodiments, some or all of a given subsystem or component can be integrated into one or more of the other subsystems or component(s) in electronic device 800. For example, in some embodiments program module 822 is included in operating system 824.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 814, such as one or more radios. Moreover, the integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios.

In some embodiments, networking subsystem 814 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, networking subsystem 814 may include at least one port (such as an HDMI port 832) to receive and/or provide the information in the data stream to at least one of A/V display devices 114 (FIG. 1), at least one of speakers 118 and/or one of content sources 128 (FIG. 1).

While a communication protocol compatible with Bluetooth low energy was used as an illustrative example, the described embodiments may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 822, operating system 824 (such as drivers for interface circuits 818) and/or in firmware in interface circuits 818. Alternatively or additionally, at least some of the operations in the communication technique may be implemented in a physical layer, such as hardware in interface circuits 818.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via voice recognition) and/or based on where they are looking at one a display in portable electronic device 110 or on one of A/V display devices 114 in FIG. 1 (e.g., by tracking the user's gaze or where the user is looking).

Furthermore, while A/V hubs 112 (FIG. 1) were illustrated as separate components from A/V display devices 114 (FIG. 1), in some embodiments an A/V hub and an A/V display device are combined into a single component or a single electronic device.

While the preceding embodiments illustrated the communication technique with audio and/or video content (such as HDMI content), in other embodiments the communication technique is used in the context of an arbitrary type of data or information. For example, the communication technique may be used with home-automation data. In these embodiments, A/V hub 112 (FIG. 1) may facilitate communication among and control of a wide variety of electronic devices. Thus, A/V hubs 112 (FIG. 1) and the communication technique may be used to facilitate or implement services in the so-called Internet of things.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
one or more antennas;
an interface circuit communicatively coupled to the one or more antennas, wherein the electronic device is configured to:
   receive, via the interface circuit, a first message associated with a first receiver device with first performance information about communication between the first receiver device and a portable electronic device;
   receive, via the interface circuit, a second message associated with a second receiver device with second performance information about communication between the second receiver device and the portable electronic device;
   determine that the portable electronic device is in a first environment based on the first performance information, the second performance information, and a history of behavior of an individual associated with the portable electronic device and the electronic device; and
   provide, via the interface circuit, an instruction to power on a display device in the first environment based on the determination.

2. The electronic device of claim 1, wherein the first environment and the second environment are one of: in a room in a building, and adjacent rooms in the building.

3. The electronic device of claim 1, wherein, when the determination is inconclusive, the electronic device is configured to provide, via the interface circuit, a question for the portable electronic device requesting that an environment of the portable electronic device be specified.

4. The electronic device of claim 1, wherein the electronic device is configured to provide, via the interface circuit, content to the display device based on the history of behavior of the individual associated with the electronic device.

5. The electronic device of claim 1, wherein the determination is based on a comparison of the first performance information and the second performance information.

6. The electronic device of claim 1, wherein the determination is based on a location of the portable electronic device, which is determined based on the first performance information and the second performance information.

7. The electronic device of claim 1, wherein given performance information in the first performance information and the second performance information includes a received signal strength indicator (RSSI).

8. The electronic device of claim 1, wherein the given performance information in the first performance information and the second performance information includes time-of-flight information for the communication between the given receiver device and the portable electronic device.

9. The electronic device of claim 1, wherein the electronic device is configured to:
   transcode content for the individual based on a format of the display device; and
   provide, via the interface circuit, the transcoded content for the display device.

10. The electronic device of claim 1, wherein the electronic device further comprises:

a processor; and a memory, coupled to the processor, which stores a program module, wherein, when executed by the processor, the program module causes the electronic device to perform one or more of: the receiving of the first message, the receiving of the second message, the determining that the portable electronic device is in the first environment, and the providing the instruction.

11. A non-transitory computer-readable storage medium for use with an electronic device, the computer-readable storage medium storing a program module that, when executed by the electronic device, determines an environment of a portable electronic device by performing one or more operations comprising:

receiving, via an interface circuit in the electronic device, a first message associated with a first receiver device with first performance information about communication between the first receiver device and the portable electronic device;

receiving, via the interface circuit, a second message associated with a second receiver device with second performance information about communication between the second receiver device and the portable electronic device;

determining that the portable electronic device is in a first environment of the first receiver device based on the first performance information, the second performance information, and a history of behavior of an individual associated with the portable electronic device and the electronic device; and providing, via the interface circuit, an instruction to power on a display device in the first environment based on the determination.

12. The computer-readable storage medium of claim 11, wherein the first environment and the second environment are one of: in a room in a building, and adjacent rooms in the building.

13. The computer-readable storage medium of claim 11, wherein the one or more operations comprise providing, via the interface circuit and when the determination is inconclusive, a question for the portable electronic device requesting that the environment of the portable electronic device be specified.

14. The computer-readable storage medium of claim 11, wherein the one or more operations comprise providing, via the interface circuit content to the display device based on the history of behavior of the individual associated with the electronic device.

15. The computer-readable storage medium of claim 11, wherein the determination is based on a comparison of the first performance information and the second performance information.

16. The computer-readable storage medium of claim 11, wherein the determination is based on a location of the portable electronic device, which is determined based on the first performance information and the second performance information.

17. The computer-readable storage medium of claim 11, wherein given performance information includes a received signal strength indicator (RSSI).

18. The computer-readable storage medium of claim 11, wherein the given performance information includes time-of-flight information for the communication between the given receiver device and the portable electronic device.

19. The computer-readable storage medium of claim 11, wherein the one or more operations comprise:

transcoding content for the individual based on a format of the display device; and providing, via the interface circuit, the transcoded content for the display device.

20. A method for determining an environment of a portable electronic device, wherein the method comprises:

by an electronic device:

receiving, via an interface circuit in the electronic device, a first message associated with a first receiver device with first performance information about communication between the first receiver device and the portable electronic device;

receiving, via the interface circuit, a second message associated with a second receiver device with second performance information about communication between the second receiver device and the portable electronic device;

determining that the portable electronic device is in a first environment of the first receiver device based on the first performance information, the second performance information, and a history of behavior of an individual associated with the portable electronic device and the electronic device; and providing, via the interface circuit, an instruction to power on a display device in the first environment based on the determination.

* * * * *